United States Patent [19]

Hachisuka et al.

[11] Patent Number: 5,811,196
[45] Date of Patent: Sep. 22, 1998

[54] LAMINATED ASYMMETRIC MEMBRANE AND METHOD FOR MANUFACTURING THE SAME

[75] Inventors: Hisao Hachisuka; Kenichi Ikeda, both of Osaka, Japan

[73] Assignee: Nitto Denko Corporation, Osaka, Japan

[21] Appl. No.: 803,982

[22] Filed: Feb. 21, 1997

[30] Foreign Application Priority Data

Feb. 23, 1996 [JP] Japan ................................. 8-036436

[51] Int. Cl.⁶ .................................................. B32B 27/00
[52] U.S. Cl. ...................... 428/473.5; 428/412; 428/413; 428/419; 428/421; 428/474.4
[58] Field of Search ................... 428/412, 413, 428/419, 421, 473.5, 474.4

[56] References Cited

U.S. PATENT DOCUMENTS

| | | | |
|---|---|---|---|
| 3,133,132 | 5/1964 | Loeb et al. | 264/49 |
| 3,133,137 | 5/1964 | Loeb et al. | 264/233 |
| 4,230,463 | 10/1980 | Henis et al. | 55/16 |
| 4,277,344 | 7/1981 | Cadotte | 210/654 |
| 4,673,418 | 6/1987 | Peinemann | 96/12 X |
| 4,705,540 | 11/1987 | Hayes | 55/16 |
| 4,717,393 | 1/1988 | Hayes | 96/4 X |
| 4,717,394 | 1/1988 | Hayes | 55/16 |
| 4,784,880 | 11/1988 | Coplan et al. | 96/12 X |
| 4,838,900 | 6/1989 | Hayes | 96/4 X |
| 4,857,080 | 8/1989 | Baker et al. | 96/12 X |
| 4,880,441 | 11/1989 | Kesting et al. | 55/16 |
| 4,902,422 | 2/1990 | Pinnau et al. | 210/500.23 |
| 4,929,405 | 5/1990 | Kohn | 264/41 |
| 4,948,400 | 8/1990 | Yamada et al. | 96/14 X |
| 4,954,144 | 9/1990 | Burgoyne, Jr. et al. | 96/14 X |
| 4,983,191 | 1/1991 | Ekiner et al. | 210/500.39 X |
| 4,990,255 | 2/1991 | Blume et al. | 96/13 X |
| 5,061,298 | 10/1991 | Burgoyne, Jr. et al. | 96/14 X |
| 5,067,970 | 11/1991 | Wang et al. | 210/500.39 X |
| 5,085,676 | 2/1992 | Ekiner et al. | 55/158 |
| 5,085,776 | 2/1992 | Blume et al. | 96/13 X |
| 5,112,941 | 5/1992 | Kasai et al. | 96/14 X |
| 5,160,353 | 11/1992 | Gochaxnour | 96/13 X |
| 5,165,963 | 11/1992 | Matsumoto et al. | 427/245 |
| 5,178,940 | 1/1993 | Matsumoto et al. | 96/14 X |
| 5,266,100 | 11/1993 | Simmons | 96/14 X |
| 5,286,539 | 2/1994 | Kusuki et al. | 96/13 X |
| 5,322,549 | 6/1994 | Hayes | 96/4 X |
| 5,443,728 | 8/1995 | Macheras et al. | 210/500.39 X |
| 5,558,936 | 9/1996 | Chung et al. | 210/500.39 X |
| 5,599,380 | 2/1997 | Koras | 96/4 X |
| 5,605,627 | 2/1997 | Carlsen et al. | 210/500.39 X |
| 5,635,067 | 6/1997 | Macheras | 210/500.39 X |

FOREIGN PATENT DOCUMENTS

| | | | |
|---|---|---|---|
| 59-062305 | 4/1984 | Japan | 96/12 |
| 61-133106 | 6/1986 | Japan | 96/14 |
| 62-42722 | 2/1987 | Japan . | |
| 4-40223 | 2/1992 | Japan . | |
| 5-49882 | 3/1993 | Japan . | |
| 5-146651 | 6/1993 | Japan . | |
| 5-184887 | 7/1993 | Japan . | |

OTHER PUBLICATIONS

A. Fritzsche, et al., "Polysulfone Hollow Fiber Membranes Spun from Aliphatic Acid ($c_2$–$C_4$): N–Methylpyrrolidone Complexes—Structure Determination by Oxygen Plasma Ablation", Journal of Applied Polymer Science, vol. 41, 1990, pp. 713–733.

Chern, et al., "Preparation of Composite Membranes via Interfacial Polyfunctional Condensation for Gas Separation Applications", Journal of Applied Polymer Science, vol. 44, 1992, pp. 1087–1093.

Chung, et al., "Development of a defect–free 6FDA–durene asymmetric hollow fiber and its composite hollow fibers", Journal of Membrane Science, 88(1994) pp. 21–36.

*Primary Examiner*—Edward J. Cain
*Attorney, Agent, or Firm*—Merchant, Gould, Smith, Edell, Welter & Schmidt, P.A.

[57] ABSTRACT

A laminated asymmetric membrane comprising first and second asymmetric membranes having different molecular structures, in which the first and second asymmetric membranes are laminated. Consequently, the laminated asymmetric membrane having the excellent property of the separation and permeability can be provided at a low cost. The laminated asymmetric membranes of the present invention is manufactured by the following steps: a film-forming dope (1) was prepared by synthesizing fluorine-containing polyimide having a repeating unit expressed by the following Chemical Formula by using diethylene glycol dimethyl ether as a solvent; a film-forming dope (2) was prepared by dissolving polysulfone in diethylene glycol dimethyl ether; the dope (2) from the resulted two dopes was cast on a polyester nonwoven cloth to a thickness of approximately 50 $\mu$m by means of an applicator; the dope (1) was lap coated thereon to a thickness of 30 $\mu$m; the dope (2) on which the dope (1) is coated was dipped in water as a solidifying solution at a temperature of 25° C. for 5 minutes and in a water at a temperature of 20° C. for one hour, thus forming a laminated asymmetric membrane.

Chemical Formula

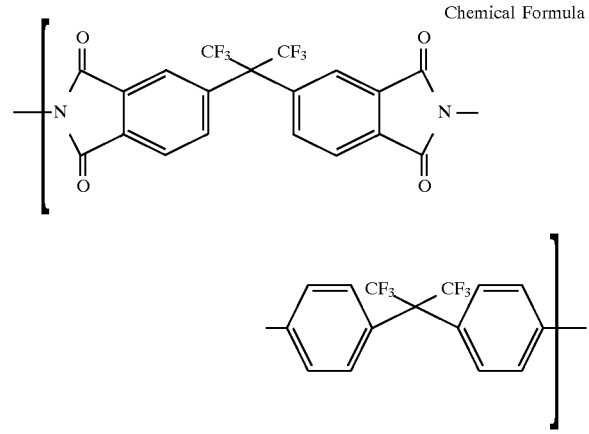

16 Claims, 1 Drawing Sheet

LAMINATED ASYMMETRIC MEMBRANE AND METHOD FOR MANUFACTURING THE SAME

FIELD OF THE INVENTION

This invention relates to a laminated asymmetric membrane comprising at least two kinds of asymmetric membranes having different molecular structures and also to a method for manufacturing the same. More particularly, the present invention relates to a laminated asymmetric membrane having a laminated structure comprising a layer comprising at least one homogeneous skin layer and porous layer which are made of the same materials and a membrane having a porous structure and made of the different membrane materials from the above mentioned layer. The present invention provides a laminated asymmetric membrane having the property of separation and permeability at a low cost.

BACKGROUND OF THE INVENTION

In the field of the reverse osmosis membrane, thin membranes has been formed on an industrial level. For example, as an asymmetric membrane, the Lobe membrane made of cellulose acetate is disclosed in U.S. Pat. Nos. 3,133,132 and 3,133,137. The surface skin layer of this membrane has a semipermeability, however it does not have a high separation property for smaller molecules such as gas molecules. On the other hand, as a composite membrane, a polyamide thin membrane formed on the porous supporting membrane by the interfacial polymerization method is disclosed in U.S. Pat. No. 4,277,344. The surface skin layer of this type of membrane also has the semipermeability, however it does not have a separation property for smaller molecules such as gas molecules, either.

Recently, reducing the thickness of the macromolecular materials such as for separating gas molecule has been investigated. This should take into consideration providing asymmetric membranes and composite membranes having a practical mechanical strength.

In the case where a macromolecular material having a high separation factor is formed as a membrane on a proper porous supporting film, it is preferable that the membrane should have no defects and that the thickness of the membrane should be not more than 100 nm so as to increase a gas permeating speed practically. U.S. Pat. No. 4,929,405 discloses that the thickness of a homogeneous fluorine-containing aromatic polyimide membrane is controlled to be smaller than the required limitation of not more than 100 nm, particularly not more than 40 nm, by the water facial expansion method. However, it is impossible to manufacture membranes having the above-mentioned thickness on an industrial level. Various methods also have been disclosed in, for example, Japanese Laid Open Patent No. Tokkai-Hei 4-40223 and U.S. Pat. No. 4,230,463, in which a polymer solution is coated onto the proper porous supporting film and then dried to form a thin film. When such an ultra thin film without having pin-holes is manufactured on an industrial level, the manufacturing process becomes complicated, the yield deteriorates and the cost is raised. Moreover, the ultra thin film has a void structure with large hole diameters and cannot be manufactured on an industrial level. The application of the interfacial polymerization method also has been investigated (See, for example, J.Appl. Polym. Sci., 44 (1992) 1087–1093). However, a sufficient permeability and separation property cannot be obtained. In addition, a membrane of the skin layer and that of the porous supporting film are not made of the same materials, thus causing detachment from each other at the interface and also deteriorating the strength of the membrane.

An asymmetric membrane has been investigated in various ways. Tai-Chung et al. in J. Memb. Sci. 88 (1994) 21–36 discloses a hollow fiber membrane having a no-defects skin layer in the 200–300 nm range. But a pinhole-free skin layer having a thickness of not more than 100 nm that satisfies the required limitation cannot be manufactured on an industrial level. Moreover, the method for manufacturing an asymmetric membrane is disclosed in U.S. Pat. No. 4,705,540 etc in which an asymmetric membrane is formed by drying the surface of a membrane and then dipping it in water. But this method has not come into practice. In other words, this method remains as a laboratory level method for manufacturing membranes. Thus, it is difficult to provide membranes stably on an industrial level by this method. U.S. Pat. No. 4,880,441 and J. Appl. Polym. Sci., 41 (1990) 713–733 etc disclose an asymmetric membrane (a hollow fiber membrane) having skin layers that gradually become dense, but these membranes are also insufficient in the thickness as well as the method for industrial use. Moreover, these asymmetric membrane have a relatively dense porous layer located under the skin layer, causing problems such that as the amount of the permeability of the skin layer increases, the permeation resistance of the porous layer increases. In order to obtain a pinhole-free asymmetric membrane, Japanese Laid Open Patent No. Tokkai-Hei 5-049882 and Tokkai-Hei 5-146651 disclose the post-treatment method and Japanese Laid Open Patent No. Tokkai-Hei 5-184887 disclose the pre-treatment method. Moreover, U.S. Pat. Nos. 4,902,422, 5,085,676 and 5,165,963 disclose the improvement in the manufacturing process. However, the above-mentioned methods have problems as follows: the manufacturing process is increased and becomes complicated; the manufacturing cost is raised; and it is difficult to manufacture membranes stably on an industrial level.

Moreover, there is a practical problem in terms of the price of materials. It is required to maintain the membrane property of a fluorine-containing polyimide or the like and to reduce the amount of its use as much as possible. Various kinds of methods of reducing the amount of the use of fluorine-containing membrane by coating a polymer onto the porous supporting membrane and forming a thin film thereon are disclosed (See Published examined patent application No. Hei 6-47060). However, is is difficult for the above-mentioned method to form the ultra thin film without defect on the porous supporting membrane. In addition, the coating solvent is limited for some cases of the porous supporting layer.

As stated above, in the case where the asymmetric membrane is manufactured on an industrial level, and the separation operation is efficiently conducted, the above-mentioned conventional technology cannot provide the required membrane structure. More specifically, membrane materials that have a high separation property such as fluorine containing polyimide are expensive and it is difficult in terms of cost to put into practice by using only the above mentioned material. On the other hand, when a cheap and commercially available membrane material is employed, the property of separation for the membrane cannot be improved, raising a problem in this property.

SUMMARY OF THE INVENTION

In order to solve the above-mentioned conventional problems, the objective of the present invention is to provide a laminated asymmetric membrane having the excellent separating property at low cost by laminating at least one asymmetric membrane having the separating property and an asymmetric membrane having the porous structure made of different membrane materials.

In order to achieve the above mentioned objective, the laminated asymmetric membrane has a structure in which at least first and second asymmetric membranes having different molecular structures are laminated.

It is preferable in the above mentioned laminated asymmetric membrane that at least one of first and second asymmetric membranes has a homogeneous skin layer part of a thickness of 5–1000 nm.

In the above-mentioned description, asymmetric membrane denotes a membrane having a continuous structure of surface skin layer and porous layer, both of which have the same materials. The surface skin layer, has a denser structure than the porous layer part. Moreover, the porous layer denotes a membrane having a sponge structure and/or a finger void structure (a structure having finger-shaped large holes). Moreover, in the description above, the surface skin layer also includes a homogeneous skin layer having the gas separation property.

It is further preferable that the above mentioned laminated asymmetric membrane comprises at least one F-atom in a repeating molecular unit of at least one of the first and second asymmetric membrane.

It is also preferable that the above mentioned laminated asymmetric membrane comprises at least one —$CF_3$ group in a repeating molecular unit of at least one of the first and second asymmetric membranes.

It is preferable in the above mentioned laminated asymmetric membrane that a thin film of an elastomer polymer is further formed on the laminated asymmetric membrane.

It is also preferable in the above mentioned laminated asymmetric membrane that the thin film of an elastomer polymer is formed by cross-linking a cross-linkable silicone resin.

It is preferable in the above mentioned laminated asymmetric membrane that at least one of the first and second membrane is formed of a membrane material resin is a fluorine-containing polyimide comprising a repeating molecular unit as a main component shown in Chemical Formula 1:

comprises the steps of making film-forming solutions by the dissolving the material resin of at least two kinds of asymmetric membranes in respective organic solvents; laminating the film-forming solutions in the form of two layers; and dipping the two-layered asymmetric membranes into a solvent (B) which does not dissolve the material resin of the asymmetric membrane but is miscible with the organic solvent.

It is preferable in the above mentioned method that a method for laminating at least two kinds of film-forming solutions is at least one method selected from the group consisting of the method of extruding the film-forming solution in a tube shape, a hollow fiber shape or sheet shape and the method of coating the film-forming solution onto a support body at one time or in order as layers.

It is preferable in the above mentioned method that at least one solvent to dissolve a material resin of an asymmetric membrane is an organic solvent (A) having a dielectric constant of not more than 30 and a dipole moment of not more than 3.0 D.

It is preferable in the above mentioned method that at least one solvent to dissolve a resin material for an asymmetric membrane is an organic solvent (C) having an organic solvent comprising at least one ether bond in its molecular structure unit.

It is preferable in the above mentioned method that the organic solvent (A) has a dielectric constant of not more than 10 and a dipole moment of not more than 3.0 D.

It is preferable in the above mentioned method that an organic solvent (A) or an organic solvent (C) contains at least one solvent selected from the group consisting of diethylene glycol dimethyl ether, diethylene glycol diethyl ether, and mixture thereof, as a main component.

It is preferable in the above mentioned method that the solvent (B) is at least one material selected from the group consisting of water, alcohol whose carbon atomic number is 1 to 4 and a mixture of water and alcohol.

It is preferable in the above mentioned method that at least one membrane material resin is a fluorine-containing polyimide having a repeating molecular unit shown in the above mentioned Chemical Formula 1.

The present invention provides an asymmetric membrane having a porous structure comprising thin films made of

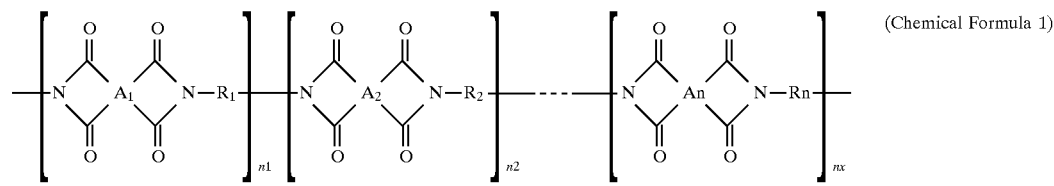

(Chemical Formula 1)

where $A_1$–$A_n$ represent quadrivalent organic groups selected from the group consisting of aromatic, alicyclic and aliphatic hydrocarbon groups, $R_1$–$R_n$ represent divalent aromatic, alicyclic or aliphatic hydrocarbon group or a divalent organic group where the above mentioned hydrocarbon groups are bonded by divalent organic groups; at least one organic group of $A_1$–$A_n$ and $R_1$–$R_n$ is an organic group having at least three fluorine atoms; the various A and R groups can be the same or different; and n1–nx are integers representing repeating number of repeating unit, that is, each of n1, n2, nx is an independent number respectively.

According to the method for manufacturing the laminated asymmetric membrane of the present invention, the method different membrane materials by the wet phase transversion film forming method, through the following procedures of: preparing at least one dope for manufacturing laminated asymmetric membranes by the use of a specific solution; coating the dope comprising the different resin materials in the formation of two layers, or extruding the dope in a tube shape or a sheet shape. According to the above mentioned method for forming at least two thin layers of asymmetric membrane having a porous structure made of the different membrane materials, the present invention can provide a laminated asymmetric membrane having an excellent separation property at a low cost.

The structure of expressing at least one property of separation of the above mentioned laminated asymmetric membrane of the present invention is not limited, as long as the laminated asymmetric membrane has the separation property. However, in order to obtain the stable property of the membrane, it is preferable that the structure of the asymmetric membrane forms a continuous structure comprising a homogeneous skin layer part having an average thickness of 5–1000 nm and a porous layer made of the same material as the above mentioned skin layer, and that the cross section thereof does not have a finger void structure comprising pores of not less than 3 μm in its porous layer.

The present invention can provide the laminated asymmetric membrane having the property of separation and permeation at low cost, by laminating two kinds of asymmetric membranes having a different molecular structure. In other words, in the above mentioned structure, for example, an expensive layer comprising a homogeneous skin layer and a porous layer and having the separation property, and an asymmetric membrane which is made of a cheap polymer and has a sufficient thickness and mechanical strength are laminated. In this type of the asymmetric membrane, it is practically preferable that at least one asymmetric membrane has the homogeneous skin layer having the thickness of 5–1000 nm, so that the membrane has the high separation property. This homogeneous skin layer does not always exist in the outer surface of an asymmetric membrane, it may be present inside. In order to form the stable homogeneous skin layer and obtain the stable separation property, it is preferable that the membrane has the homogeneous skin layer in its outer most surface. The membrane may have a plurality of the homogeneous skin layers, but in order to form the stable homogeneous skin layers and provide the separation property with the homogeneous skin layer, it is preferable that the homogeneous skin layer exists only in the outer surface.

Moreover, the method of manufacturing the laminated asymmetric membrane of the present invention comprises the steps of making a film-forming solution by dissolving material resin of at least two kinds of asymmetric membranes in an organic solvent respectively; laminating the film-forming solution in at least two layers; and dipping the two-layered asymmetric membranes into a solvent (B) which does not dissolve the material resin of asymmetric membrane but is miscible with the organic solvent. According to this method, the laminated asymmetric membranes can be efficiently manufactured.

DETAILED DESCRIPTION OF INVENTION

Figure 1:
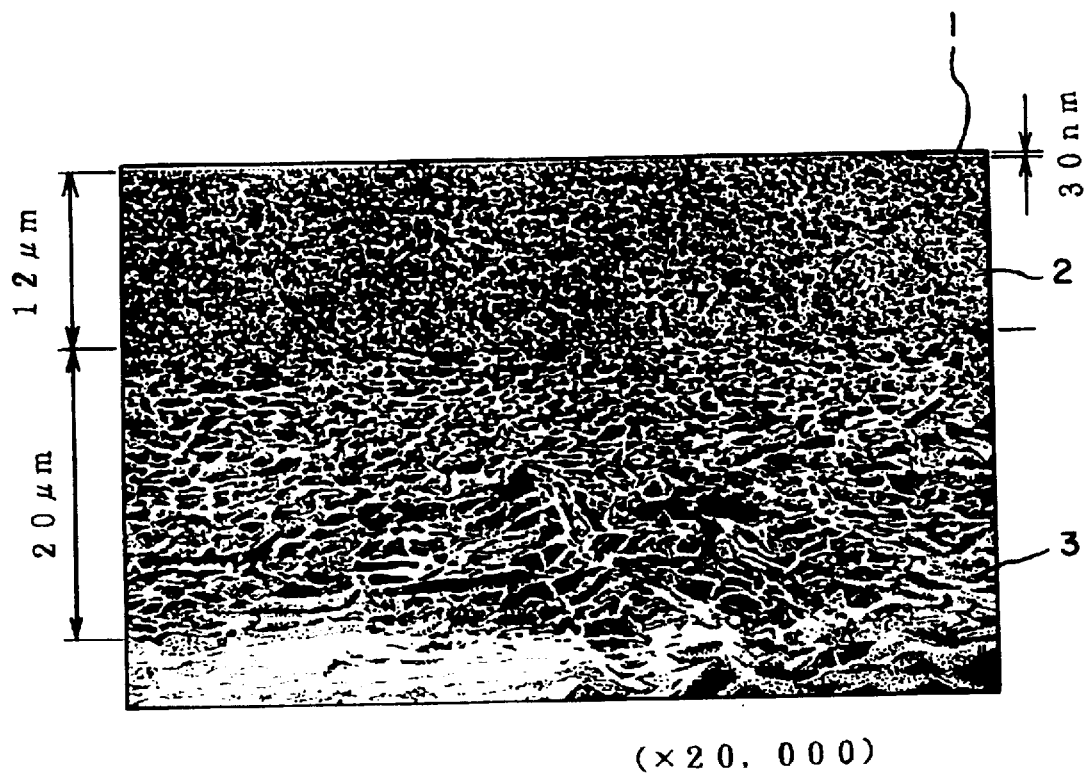
FIG. 1 is a traced drawing of a photograph taken by the scanning electron microscope (SEM) having the field emission (FE) electron gun, showing the laminated asymmetric membrane of the first example of the present invention.

The membrane material employed for the present invention is not limited, and any membrane materials that can be dissolved into the following organic solvent (A) or organic solvent (C) can be used. For example, polyimide expressed in the aformentioned Chemical Formula (1) is preferably employed. In the Chemical Formula (1), as an organic group having not less than three fluorine atoms at least one of which is present in $A_1$–$A_n$ and/or $R_1$–$R_n$, —$CF_3$ is employed. For example, a quadrivalent group expressed in the following Chemical Formula (2) is preferably employed.

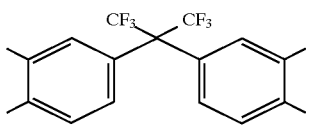

Chemical Formula (2)

A serious problem is not caused if amic acid is partially maintained in all of the imide ring parts of the above-mentioned formula (1), as long as the ratio is 30 mol % or less. That is, the imide reacting ratio should be not less than 70%, and this ratio is calculated by quantifying the number of the remaining —COOH to the whole imide ring parts by the use of $^1$H-NMR. When the ratio is over 30 mol %, the lipophilicity between the organic solvent (A) or the solvent (C) and solvent (B) is raised due to the increase of —COOH. As a result, pin holes are formed and the separation property of the fluorine-containing polyimide gas separation membrane is deteriorated.

The fluorine-containing polyimide resins can be used alone or as a mixture comprising not less than two polyimide type resins. Furthermore, it can be a copolymer or a mixture with polymers such as polyimide, kinds of cellulose, polysulfone type resin materials and polyethylene glycol or the like, other than a fluorine-containing polyimide resin. The percentage of these other components, however, does not exceed 50 mol %.

The organic solvent (A) of the present invention has a dielectric constant of not more than 30 and a dipole moment of not more than 3.0 D. More preferably the dielectric constant is not more than 10. Since the polarity of the organic solvent (A) of the present invention is small, the organic solvent (A) can be sufficiently mixed with (B) but the lipophilicity with the solvent (B) which is used as a solidifying solution is weak. Therefore, when both solutions are in contact with each other, an interface is temporarily formed at their boundary surfaces. Consequently, when a homogeneous skin layer is formed by the wet phase transversion film-forming method, the doping solution and the solvent used as a solidifying solution can provide a laminated asymmetric membrane by using the interface. Thus film-forming on an industrial level is realized while pin holes are not formed in a wide range of the homogeneous skin layer.

Although the organic solvent (A) which is used in the present invention is not limited, as long as the above-mentioned condition is satisfied, diethylene glycol dimethyl ether (the dielectric constant is 5.97 and the dipole moment is 1.97 D) is preferably employed. In addition, 1,2-dimethoxyethane (the dielectric constant is 5.50 and the dipole moment is 1.79 D) or the like is also taken as a preferable example. These solvents can be used alone or as a mixed solvent comprising two solvents or more. An aprotic solvent having a dielectric constant of over 30 and/or a dipole moment of over 3.0 D may be added so as to adjust the solubility of the fluorine-containing polyimide and the viscosity of the dope. The amount of the aprotic solvent, however, does not exceed 30 weight % (wt.%). When the above-mentioned aprotic solvent is added, an organic solvent including diethylene glycol dimethyl ether in an amount of 60–100 weight % (wt. %) is preferably used as the organic solvent (A) in the present invention. For instance, a mixture containing diethylene glycol dimethyl ether in an amount of 67 wt. % and N-methyl pyrrolidone (NMP) in an amount of 33 wt. % is taken as an example.

The above-mentioned aprotic polar solvents which have been conventionally used as doping solvents include N-methyl-2-pyrrolidone (the dielectric constant is 32 at the temperature of 25° C. and the dipole moment is 4.00 D at the temperature of 30° C.); N,N-dimethyl acetamide (the dielectric constant is 37.8 at the temperature of 25° C. and the dipole moment is 3.72 D at the temperature of 30° C.); N, N-dimethyl formamide (the dielectric constant is 36.7 at the temperature of 25° C. and the dipole moment is 3.86 D at the temperature of 25° C.); and dimethyl sulfoxide (the dielectric constant is 48.9 at the temperature of 20° C. and the dipole moment is 4.30 D). Thus, these conventional aprotic polar solvents have the dielectric constant of not less than 32 and the dipole moment of not less than 3.7 D. Moreover, the lipophilicity with the solidifying solvent, for example, water is thought to be strong. When the above-mentioned solvent and solidifying solvent are in contact with each other, the interface is not generated due to the strong lipophilicity between the solvent and solidifying solvent. Consequently, the doping solvent leaches into the solidifying solvent faster than the skin layer formed through the wet phase transversion film-forming method. As a result, pin holes are generated in the wide range of the homogeneous skin layer. If this conventional aprotic polar solvent is used for the wet phase transversion film-forming method, a dope for film-forming is cast or spun in a porous supporting body, and then left for a predetermined time at a predetermined temperature to partially evaporate the solvent. In this case, however, since the lipophilicity of the above-mentioned aprotic polar solvent with water is too strong, it absorbs the moisture in the air. Thus, the surface becomes white and more pin-holes are formed.

An organic solvent (C) of the present invention is not particularly limited, as long as it includes mainly an organic solvent that has at least one ether bond in its molecular unit. As such examples, diethylene glycol dimethyl ether, diethylene glycol diethyl ether, diethylene glycol dibuthyl ether, triethylene glycol diethyl ether, 1,2-dimethoxyethane, 1,2diethoxyethane, and 1,2-dibutoxyethane or the like are employed. It is preferable that organic solvent (A) or an organic solvent (C) has at least one solvent selected from the group consisting of diethylene glycol dimethyl ether, diethylene glycol diethyl ether and mixture thereof as a main component. These materials can be used alone or as a mixture of plural kinds of solvent. An aprotic solvent having no ether bonding in its molecular unit can be added in order to adjust the solubility of the fluorine-containing polyimide and the viscosity of the dope. The amount of the above mentioned aprotic solvent does not exceed 30 wt. %. These solvents have the same characteristics as the above-mentioned organic solvent (A) with respect to the solidifying solvent (B).

The above mentioned membrane materials having the laminated structure with asymmetric membrane are not limited, as long as the wet-type phase transversion film-forming method can be applied. However, it is preferable that its cost is low. Examples of membrane materials include polysulfone, ethylenepolyvinyl alcohol copolymer, non-fluorine containing polyimide, polyamide or the like. Moreover, the dope adjusting solution using the above mentioned materials is not limited as long as the solution can dissolve these membrane materials and can be mixed with the following solution (B). The above mentioned solution (B) includes an aprotic polar solvent such as N-methyl-2-pyrolidone, N,N-dimethyl acetamide, N, N-dimethyl formamide, and dimethyl sulfoxide or the like. In addition, diethylene glycol dimethyl ether, diethylene glycol diethyl ether, diethylene glycol dibuthyl ether, triethylene glycol diethyl ether, 1,2-dimethoxyethane, 1,2-diethoxyethane, and 1,2-dibutoxyethane or the like are employed.

The wet phase transversion film-forming method using the above-mentioned dope will be explained below. Although the film-forming method and the shape of the asymmetric membrane are not limited in the present invention, the asymmetric membrane can be provided in a tubular shape (including hollow fiber shape) or flat shape (sheet shape) in the formation of two layers, by the extrusion method or the casting method where at least one dope forming layer which has the separation property and is made of organic solvent (A) or (C) and the dope comprising the different membrane materials.

A flat shaped membrane is obtained in the following steps of: coating a dope onto the porous support; and dipping the support on which the dope is coated in the solidifying solvent, that is, solution (B). Consequently, a laminated asymmetric membrane is obtained in a form of composite membrane, improving the mechanical strength of the laminated asymmetric membrane of the present invention. The coating methods of the present invention include the extruding, casting, lap coating method or the like. The viscosity of dope which is used for lap coating is required to be the same in every layer or to be decreased in order. A glass plate having an even surface or a porous support can be used for the support for the present invention. The porous supports include an organic, inorganic or metallic porous materials, woven cloth, nonwoven cloth and the like. Since fluorine-containing polyimide or other expensive membrane materials is preferably selected because of the excellent property of the membrane, the thickness of the dope on the porous support ranges from 1 to 200 µm, or more preferably, from 10 to 100 µm. On the other hand, the thicknesses of other layers range from 25 to 400 µm, or more preferably, from 30 to 200 µm. The total thickness of the membrane is preferably not less than 600 µm.

Each dope used in the present invention is formed at the temperature from −80° to 80° C., more preferably at the temperature from −20° to 40° C.

The solidifying solution, that is, the solvent (B) is used to remove the above mentioned various organic solvents. So the solvent (B) is not limited, as long as it is miscible with such solvents while it does not dissolve the resins. However, water, methanol, ethanol, and isopropyl alcohol, or a mixture thereof can be used. Among them, water is preferably used. Although the temperature of the solidifying solution, that is, solvent (B) is not particularly limited, the soaking and removal is preferably conducted at the temperature ranging from 0° to 50° C.

It is further preferable in the laminated asymmetric membrane of the present invention that the surface of the membrane be coated with elastomer polymer. In the case where defects (pin-holes) are generated on the surface of the skin layer, the pin holes on the surface are filled and the surface is prevented from being scratched, by laminating thin films of the elastomer polymer, The elastomer polymer is a kind of polymer that can form flexible films, which includes ethylene monomer, monopolymer or copolymer of conjugated diene monomer. The examples include polypropylene, polyvinylchloride, ethylenepropylene copolymer, ethylene-propylene-diene copolymer, polybutadiene, polyisoprene, chloroprene rubber, poly (4-methyl-penten-1), butadiene-styrene copolymer, isoprene-isobutylene copolymer, or polyisobutylene or the like. In addition to the above-mentioned monomer components, copolymers containing monomer components having functional groups, such as acrylonitrile, methacrylate, methacrylic acid, or copolymers having both of the soft and hard segments are also included. The examples of the latter copolymers include polyether polyol, polyurethane polyether, polyurethane polyester, and polyamide polyether. Some other materials that are cured by a curing agent having straight and long chains are also used as the elastomer polymers. The examples are epoxy resin, ethyl cellulose, and butoxy resin. A crosslinked silicone resin is especially preferred as the elastomer polymer in the present invention. Such a crosslinked silicone resin is soluble in organic solvents before it is crosslinked. However, it is not dissolved in organic solvents after crosslinking. Such a silicone resin can be manufactured in a manner disclosed in Japanese Laid Open Patent No. Tokkai-Sho 59-225705.

When an element is formed by the use of the above mentioned laminated asymmetric membrane, the form of the element using the laminated asymmetric membrane is not limited. It will be a hollow element when it is extruded to be a tubular shape. When it is coated on a proper support, it can be modulized as a spiral, flat, or tubular shaped element.

Referring now to specific embodiments, the present invention is not limited to these embodiments.

EXAMPLE 1

A fluorine-containing polyimide comprising a repeating unit expressed by the following Chemical Formula (3) was synthesized in the following method using the solvent of diethylene glycol dimethyl ether.

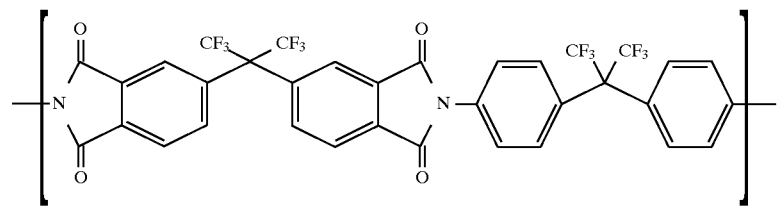

Chemical Formula (3)

The synthesizing method includes the following procedures of dissolving 0.75 mol of 2.2-bis (4-aminophenyl) hexafluoro propane (BAAF) in 1,842 grams of diethylene glycol dimethyl ether as an organic solvent (A) or (C); adding 0.75 mol of hexafluoro isopropylidine -2,2-bis (phthalic acid anhydride) (6 FDA) to the above mentioned solvent under a nitrogen atmosphere; stirring for eight hours at room temperature and polymerizing so as to obtain polyamic acid; then adding 406 grams of diethlene glycol dimethyl ether thereto; after the solution becomes homogeneous, adding 2.25 mol of pyridine (imide reacting agent) and 2.25 mol of acetic anhydride (imide reacting agent); and stirring for twelve hours at room temperature so as to conduct an imide reaction. After the above-mentioned imide reaction was conducted, the obtained solution was filtered as a film-forming solution and left for full deaeration. Thus, the film-forming dope (1) was prepared.

As a film-forming dope (2), a 24 wt % solution was prepared by dissolving polysulfone into dietylene glycol dimethyl ether.

The dope (2) from the resulted two kinds of dopes was cast on a polyester nonwoven cloth to a thickness of approximately 50 $\mu$m by means of an applicator at the temperature of 25° C. The dope (1) was lap coated thereon to a thickness of 30 $\mu$m. The dope (2) on which the dope (1) is coated was soaked in water as a solidifying solution at a temperature of 25° C. for 5 minutes and in a water at a temperature of 20° C. for one hour, thus forming a laminated asymmetric membrane.

Figure 2:
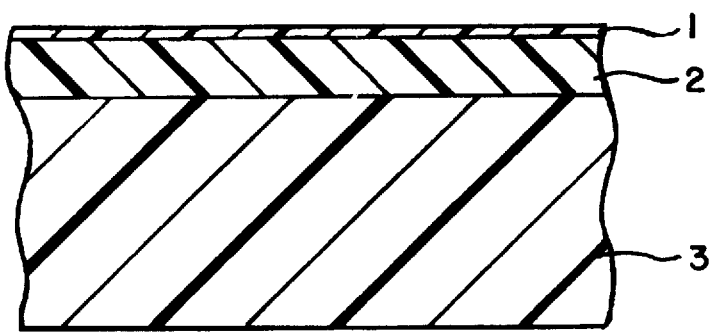
FIG. 2 is a cross sectional view of FIG. 1.

FIG. 1 shows the traced drawing of a photograph taken by the scanning electron microscope (SEM) having the field emission (FE) electron gun, showing the cross section of the laminated asymmetric membrane. In FIG. 1, numeral 1 is a skin layer (thickness is approximately 30 nm) comprising fluorine containing polyimide having a repeating unit expressed by the above-mentioned Chemical Formula (3), 2 is a sponge layer which has the thickness of approximately 12 $\mu$m, and 3 is a sponge layer comprising polysulfone which has the thickness of approximately 20 $\mu$m. FIG. 2 is a cross sectional view of FIG. 1. In FIG. 2, numeral 1 is a skin layer (thickness is approximately 30 nm) comprising fluorine containing polyimide having a repeating unit expressed by the above mentioned Chemical Formula (3), 2 is a sponge layer which has the thickness of approximately 12 $\mu$m, and 3 is a sponge layer comprising polysulfone which has the thickness of approximately 20 $\mu$m. The separation property of this laminated membrane is shown in Table 1.

TABLE 1

| Gas | P (Nm$^3$/m$^2$/hr/arm) | Separation Property (/CH$_4$) |
|---|---|---|
| CO$_2$ | 0.80 | 32 |
| CH$_4$ | 0.025 | 1 |

As is apparent from Table 1, the asymmetric membrane of the present invention is practically excellent in the amount of permeability and separation property.

As stated above, the present invention can provide the laminated asymmetric membrane having the property of separation and permeation at low cost, by laminating two kinds of asymmetric membranes having a different molecular structure. In other words, in the above mentioned structure, for example, an expensive layer comprising a homogeneous skin layer and a porous layer and having the separation property and an asymmetric membrane which is made of a cheap polymer and which has a sufficient thickness and mechanical strength are laminated. In this type of the asymmetric membrane, it is practically preferable that at least one asymmetric membrane has the homogeneous skin layer having the thickness of 5–1000 nm, so that the membrane has the high separation property.

The method of manufacturing the laminated asymmetric membrane of the present invention comprises the steps of making film-forming solutions by dissolving material resins of at least two kinds of asymmetric membranes in respective organic solvents; laminating the film-forming solutions in the form of at least two layers; and dipping the two-layered asymmetric membranes into a solvent (B) which does not dissolve the material resin of the asymmetric membranes but is miscible with the organic solvent. According to this method, the laminated asymmetric membranes can be efficiently and effectively manufactured.

Finally, it is understood that the invention may be embodied in other specific forms without departing from the spirit or essential characteristics thereof. The embodiments disclosed in this application are to be considered in all respects as illustrative and not restrictive, so that the scope of the invention being indicated by the appended claims rather than by the foregoing description, and all changes which come within the meaning and range of equivalency of the claims are intended to be embraced therein.

What is claimed is:

1. A laminated asymmetric membrane structure, comprising first and second asymmetric membranes having different molecular structures, at least one of the first and second asymmetric membranes having a homogenous skin layer part of a thickness of 5–1000 nm, wherein said first and second asymmetric membranes are laminated.

2. The laminated asymmetric membrane according to claim 1, wherein the homogeneous skin layer exists only at the outer most surface layer of the laminated asymmetric membrane.

3. The laminated asymmetric membrane according to claim 1, comprising at least one F-atom in a repeating molecular unit of at least one of the first and second asymmetric membranes.

4. The laminated asymmetric membrane according to claim 1, comprising at least one —$CF_3$ group in a repeating molecular unit of at least one of the first and second asymmetric membranes.

5. The laminated asymmetric membrane according to claim 1, wherein a thin film of an elastomer polymer is further formed on the laminated asymmetric membrane.

6. The laminated asymmetric membrane according to claim 5, wherein the thin film of an elastomer polymer is formed by cross-linking a cross-linkable silicone resin.

7. The laminated asymmetric membrane according to claim 1, wherein at least one of the first and second membranes is formed of a membrane material resin that is a fluorine-containing polyimide comprising a repeating molecular unit as a main component shown in Chemical Formula 1:

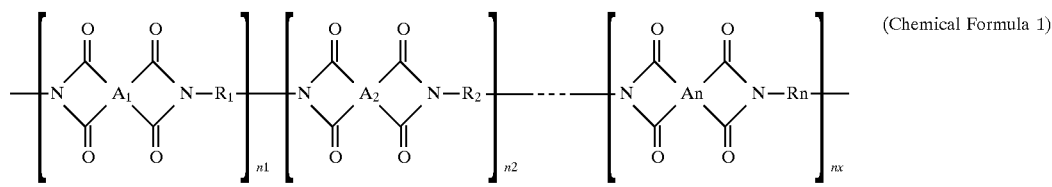
(Chemical Formula 1)

where $A_1$–$A_n$ represent quadrivalent organic groups selected from the group consisting of aromatic, alicyclic and aliphatic hydrocarbon groups, $R_1$–$R_n$ represent divalent aromatic, alicyclic or aliphatic hydrocarbon group or a divalent organic group where the hydrogen groups are bonded by the above-mentioned divalent organic groups; at least one organic group of $A_1$–$A_n$ and $R_1$–$R_n$ is an organic group having at least three fluorine atoms; the various A and R groups can be the same or difficult; and n1–nx are integers representing repeating number of repeating unit, that is, each of n1, n2, nx is an independent number respectively.

8. A method for manufacturing a laminated asymmetric membrane structure comprising at least first and second asymmetric membranes that are different from each other, at least one of the first and second asymmetric membranes having a homogenous skin layer part of a thickness of 5–1000 nm, the method comprising the steps of making first and second film-forming solutions by dissolving material resins of at least two kinds of asymmetric membranes in a respective organic solvent, laminating said film-forming solutions to form two layers; and dipping the resulting two-layered asymmetric membranes into a solvent (B) which does not dissolve said material resin of the asymmetric membrane but is miscible with said organic solvent.

9. The method for manufacturing a laminated asymmetric membrane according to claim 8, wherein the method for laminating the film-forming solutions is at least one method selected from the group consisting of the method of extruding said film-forming solutions in a tube shape, a hollow fiber shape or sheet shape and the method of coating said film-forming solutions onto a support body at one time or in order as layers.

10. The method for manufacturing a laminated asymmetric membrane according to claim 9, wherein at least one solvent to dissolve a material resin of an asymmetric membrane is an organic solvent (A) having a dielectric constant of not more than 30 and a dipole moment of not more than 3.0 D.

11. The method for manufacturing a laminated asymmetric membrane according to claim 8, wherein at least one solvent to dissolve a resin material for an asymmetric membrane is an organic solvent (C) having an organic solvent comprising at least one ether bond in its molecular structure unit.

12. The method for manufacturing a laminated asymmetric membrane according to claim 10, wherein the organic solvent (A) has a dielectric constant of not more than 10 and a dipole moment of not more than 3.0 D.

13. The method for manufacturing a laminated asymmetric membrane according to claim 8, wherein at least one organic solvent contains at least one solvent selected from the group consisting of diethylene glycol dimethyl ether, diethylene glycol diethyl ether and mixture thereof as a main component.

14. The method for manufacturing a laminated asymmetric membrane according to claim 8, wherein the solvent (B) is at least one material selected from the group consisting of water, alcohol whose carbon atomic number is 1 to 4, and a mixture of water and the alcohol.

15. The method for manufacturing a laminated asymmetric membrane according to claim 8, wherein at least one membrane material resin is a fluorine-containing polyimide having a repeating molecular unit shown in Chemical Formula 1.

16. The laminated asymmetric membrane according to claim 7, wherein the maim component denotes a component which is contained in an amount of not less than 50%.

* * * * *